Oct. 8, 1929.                    C. W. BATEMAN                    1,730,911
                                    HANGER
                              Filed May 27, 1925

INVENTOR.
Charles W. Bateman
By Henry T. Williams,
Attorney

Patented Oct. 8, 1929

1,730,911

UNITED STATES PATENT OFFICE

CHARLES W. BATEMAN, OF CONCORD, NEW HAMPSHIRE

HANGER

Application filed May 27, 1925. Serial No. 33,175.

The invention to be hereinafter described relates to hangers for supporting pipes and the like.

Heretofore it has been customary to support steam and other pipes on hangers. It is desirable that provision should be made for adjusting the pipe by lowering or raising it without disengaging the hanger from its supporting means, and also that provision should be made for any sliding or swaying movement of the pipe which may be necessary or which may take place. For example, pipes on temperature changes are subject to contraction and expansion, and in long pipe lines to quite a substantial extent. This has caused the pipes to slide somewhat relatively to their hangers with objectionable noise. I am aware that heretofore hangers have been suspended from lag screws and have had hook shaped ends which permit movement of the suspended pipe. However, in such a construction the level of the pipe cannot be adjusted without unhooking the hanger which may be difficult or impossible in the case of a long pipe line.

The purpose of the present invention, therefore, is to provide a simple, cheap hanger which can move with the pipe and which can also be readily raised or lowered while the pipe and hanger are in place.

Figure 1:
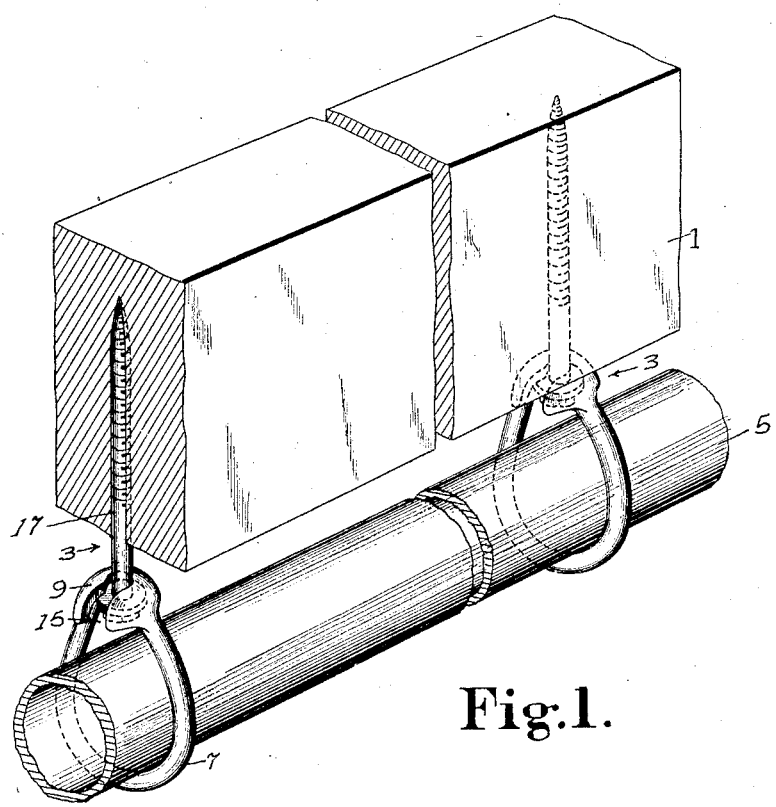
Figure 2:
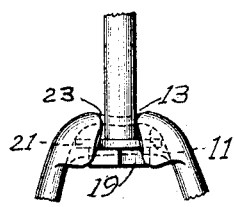

The character of the invention may be best understood by reference to the following description of one good form thereof shown in the accompanying drawing, wherein:

Fig. 1 is a perspective view of a pair of hangers embodying the invention, and a portion of a pipe carried thereby; and Fig. 2 is a detail of a portion of one of the hangers shown in Fig. 1.

Referring to the drawing, 1 designates a portion of a beam supporting a pair of hangers 3 which carry a pipe 5.

Each of these hangers comprises a ring 7 of general ovate form having a head or shell 9 in which is formed a concave seat 11 having a hole 13 therein and a lateral opening 15 communicating with the hole.

A lag screw 17 has a shank entered through the hole 13 and a head 19 or equivalent element which may be larger than the hole 13, but smaller than the concave seat 11, and which can be rotated or adjusted without removal of the hanger. Said element may include a washer 21 on the shank of the screw and resting against the head 19 and engaging the seat. The ring is formed so that there is a space for receiving the screw head between the ring head and the pipe.

The construction is such that on expansion and contraction or other longitudinal movement of the pipe, the ring 7 may rock and its concave seat may wipe on the screw head or element and allow the ring to move with the pipe in the direction of the length thereof. This is due to the concave or curved form of the seat, and the relation thereof with respect to the screw head or washer, and also to the fact that there is only a thin rounded rim 23 at the hole 13 to engage the shank of the screw. The lateral opening which communicates with the hole in the seat faces the direction of the length of the pipe, and this provides further freedom of movement.

In placing the hangers in position of use, the screws are applied to a beam or other support. Then the pipe and the rings thereon are elevated to a height such that the bottom of each ring head 9 is somewhat above the screw head or washer and the screw head is at the space between the pipe and the ring head. Then the ring may be shifted laterally, thereby to move the lateral opening past the screw shank so that the hole will receive the screw shank. Then the ring may be lowered somewhat to allow the seat to engage the screw head or washer. Since the screw head or washer is larger than the opening, there is no chance of inadvertent escape of the ring from the screw. Also it will be noticed that the screw can be readily turned without removing the hanger as, for instance, by a wrench applied to the shank of the screw. When it is desired to remove the ring from the lag screw, the ring may be lifted so that the seat will be up away from the screw head, and the latter will be in the space between the pipe and the ring head. Then the ring is shifted laterally to move the lateral opening in its head past and away from the screw shank. The rings and lag screws may be connected or separated while the pipe remains in the rings.

While lag screws are shown herein for supporting the rings, it will be understood that bolts might be employed if desired, and that the term "lag screw" employed in the claim is to be regarded as generic to a bolt.

It will be understood that the invention is not limited to the specific embodiment shown, and that various deviations may be made therefrom without departing from the spirit and scope of the appended claim.

What is claimed is:

A pipe hanger comprising in one integral piece a ring having an opening adapted to receive a pipe, and a head having a semispherical seat facing and communicating with the opening in the ring, said head being provided with a hole adapted to receive the shank of a lag screw, a rim, said rim having a lateral opening extending therethrough and communicating with the hole, said ring being of general ovate form providing at its narrower end a space between the ring head and the portion of the opening for receiving the pipe; and the lag screw having a shank entered through the hole, and a ring supporting element on an end of the lag screw, said element conforming substantially to the shape of said seat and larger than the hole and the lateral opening and not movable through the lateral opening, the space between the ring head and the pipe receiving portion of the opening being sufficiently large to receive said element in connecting and separating the lag screw and ring, said element being smaller than the seat and cooperating with the seat to allow free rocking of the ring head on the supporting element on expansion and contraction of the pipe, and said seat and element allowing rotative adjustment of the lag screw to raise or lower the pipe without unseating the ring head from the lag screw element.

CHARLES W. BATEMAN.